United States Patent
Bang et al.

(10) Patent No.: US 11,481,020 B2
(45) Date of Patent: Oct. 25, 2022

(54) ELECTRONIC DEVICE FOR CONTROLLING PROCESS AND METHOD THEREOF

(71) Applicant: Samsung Electronics Co., Ltd., Gyeonggi-do (KR)

(72) Inventors: Sungyong Bang, Gyeonggi-do (KR); Hyunjin Noh, Gyeonggi-do (KR); Byungsoo Kwon, Gyeonggi-do (KR); Jongwoo Kim, Gyeonggi-do (KR); Sangmin Lee, Gyeonggi-do (KR); Hakryoul Kim, Gyeonggi-do (KR); Mooyoung Kim, Gyeonggi-do (KR)

(73) Assignee: Samsung Electronics CO., LTD., Suwon-si (KR)

( * ) Notice: Subject to any disclaimer, the term of this patent is extended or adjusted under 35 U.S.C. 154(b) by 0 days.

(21) Appl. No.: 17/152,968

(22) Filed: Jan. 20, 2021

(65) Prior Publication Data
US 2021/0247823 A1    Aug. 12, 2021

(30) Foreign Application Priority Data
Feb. 7, 2020   (KR) .................. 10-2020-0015254

(51) Int. Cl.
*G06F 1/32*   (2019.01)
*G06F 1/3287*   (2019.01)

(52) U.S. Cl.
CPC .................. *G06F 1/3287* (2013.01)

(58) Field of Classification Search
CPC ................................................ G06F 1/3287
See application file for complete search history.

(56) References Cited

U.S. PATENT DOCUMENTS

| | | |
|---|---|---|
| 2005/0120252 A1 | 6/2005 | Uwatoko |
| 2009/0064164 A1* | 3/2009 | Bose ............... G06F 9/5094 718/105 |
| 2014/0089603 A1* | 3/2014 | Krishnapura ....... G06F 12/0806 711/146 |
| 2015/0261284 A1 | 9/2015 | Lee et al. |
| 2016/0062326 A1 | 3/2016 | Bang |
| 2018/0364786 A1 | 12/2018 | de la Cropte de Chanterac et al. |
| 2019/0327359 A1 | 10/2019 | Guo et al. |
| 2020/0036643 A1 | 1/2020 | Jang et al. |

FOREIGN PATENT DOCUMENTS

| | | |
|---|---|---|
| KR | 10-2011-0128023 A | 11/2011 |
| KR | 10-2015-0106635 A | 9/2015 |
| KR | 10-2016-0026329 A | 3/2016 |

OTHER PUBLICATIONS

International Search Report dated Apr. 19, 2021.

* cited by examiner

*Primary Examiner* — Stefan Stoynov
(74) *Attorney, Agent, or Firm* — Cha & Reiter, LLC

(57) ABSTRACT

In certain embodiments, an electronic device comprises a temperature sensor; and a processor, wherein the processor is configured to: detect that a temperature of the electronic device exceeds a predetermined temperature; when the temperature exceeds the predetermined temperature, drive at least one process satisfying a predetermined condition for a proportion of time periods and not driving the at least one process during remaining time periods.

14 Claims, 8 Drawing Sheets

ELECTRONIC DEVICE FOR CONTROLLING PROCESS AND METHOD THEREOF

CROSS-REFERENCE TO RELATED APPLICATION

This application is based on and claims priority under 35 U.S.C. § 119 to Korean Patent Application No. 10-2020-0015254 filed on Feb. 7, 2020, in the Korean Intellectual Property Office, the disclosure of which is herein incorporated by reference in its entirety.

BACKGROUND

Field

Certain embodiments of the disclosure relate to an electronic device for controlling a process and a method thereof.

Description of Related Art

Electronic devices are able to perform many functions. The performance of even the same function has been improved with the development of the technology. In addition, when the power of an electronic device is applied, functions being performed in a background are increased. For example, a data transmission speed is increased, and the electronic device can output high-resolution motion picture playback. When the electronic device is turned on, even a security-related application can operate in the background. However, since many functions are performed with limited resources, a number of problems can occur.

SUMMARY

In certain embodiments, an electronic device comprises a temperature sensor; and a processor, wherein the processor is configured to: detect that a temperature of the electronic device exceeds a predetermined temperature; when the temperature exceeds the predetermined temperature, drive at least one process satisfying a predetermined condition for a proportion of time periods and not driving the at least one process during remaining time periods.

In certain embodiments, a method for operating an electronic device, comprises: detecting that a temperature of the electronic device exceeds a predetermined temperature; when the temperature exceeds the predetermined temperature, driving at least one process satisfying a predetermined condition for a proportion of time periods and not driving the at least one process during remaining time periods.

Effects that can be obtained in the disclosure are not limited to the above-described effects, and other unmentioned effects can be clearly understood by those of ordinary skill in the art to which the disclosure pertains from the following description.

BRIEF DESCRIPTION OF THE DRAWINGS

In relation to the description of the drawings, the same or similar reference numerals may be used with respect to the same or similar constituent elements. The above and other aspects, features and advantages of certain embodiments of the disclosure will be more apparent from the following detailed description, taken in conjunction with the accompanying drawings, in which.

DETAILED DESCRIPTION

When an electronic device uses certain elements, such as a communication module or a processor, the usage can generated heat. If the amount of heat that is generated becomes excessive, the heat can degrade and even destroy the used elements.

Limiting the whole performance of a system can alleviate the foregoing problem. The method can limit the performance of the system by decreasing the number of cycles for the processor or compulsorily terminating a process being that is infrequently used. However, this may cause a problem in that user's service quality satisfaction is degraded.

According to the certain embodiments of the disclosure, the electronic device can control the heat generation of the electronic device by controlling the process being executed in the background.

According to the certain embodiments of the disclosure, the electronic device can control the heat generation of the electronic device by adaptively controlling the process less sensitive to a user's sensible performance.

According to the certain embodiments of the disclosure, it is possible not to degrade a quality of service being provided to a user while controlling the heat generation of the electronic device.

Hereinafter, certain embodiments of the disclosure may be described with reference to the accompanying drawings.

Figure 1:
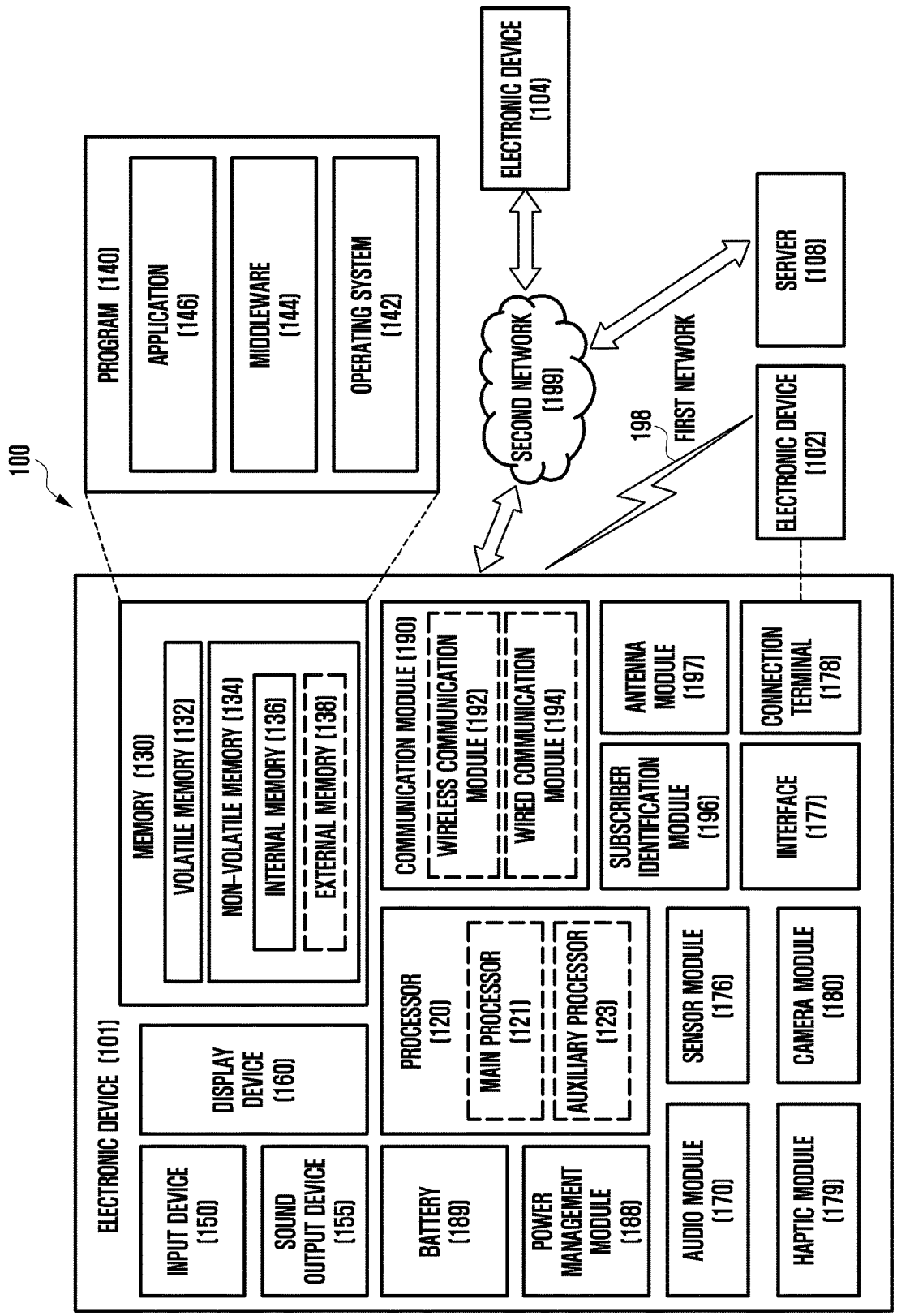
FIG. 1 is a block diagram of an electronic device in a network environment according to certain embodiments of the disclosure.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel bet ween the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input a nd output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For ex ample, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

In the disclosure, a process is a program being executed by a processor, and may be called a task or an application. The processor may schedule the process being executed in a predetermined time unit. If necessary, the processor delay scheduling the process being executed for a predetermined time. In the disclosure, a time in which the processor does not schedule/delays at least one of process from being executed and where the corresponding process does not operate may be defined as a "delay time" or "delay time of the corresponding process". A time in which the processor re-schedules the process having configured the delay time and the process operates may be defined as an "operation time" or "operation time of the corresponding process".

Figure 2:
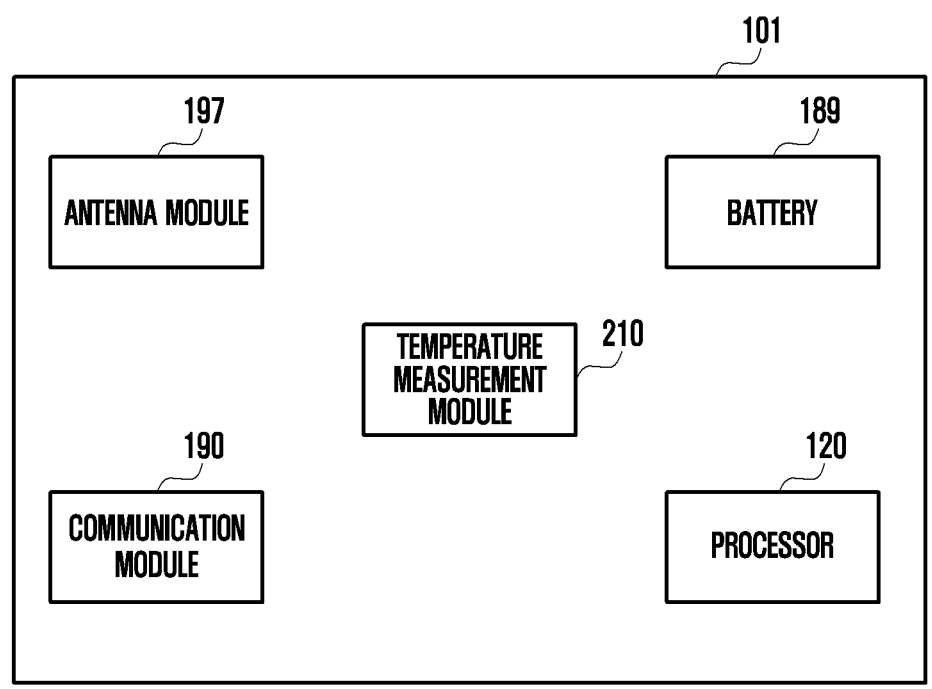
FIG. 2 is a block diagram illustrating a part of an electronic device according to certain embodiments of the disclosure.

FIG. 2 is a block diagram illustrating a part of an electronic device according to certain embodiments of the disclosure. Certain components described in the block diagram may correspond to components with like numbering in FIG. 1.

Referring to FIG. 2, an electronic device 101 may include an antenna module 197, a communication module 190, a battery 189, a processor 120, and a temperature measurement module 210.

The term "processor" shall be understood to refer to both the singular and plural contexts. The temperature measurement module 210 may include at least one temperature sensor. The at least one temperature sensor can include at least one thermometer. The temperature measurement module 210 can measure the temperature of the electronic device 101. The temperature sensor may be located around a constituent element (e.g., antenna) empirically known to have a large amount of heat generation. A plurality of temperature sensors may be located around respective constituent elements to measure the temperatures of the respective constituent elements.

For example, the plurality of temperature sensors may be disposed around at least parts of the processor 120, the battery 189, the communication module 190, and the antenna module 197, and the temperature measurement module 210 may measure the temperatures of the respective constituent elements. The temperature measurement module 210 may determine the temperature (e.g., maximum temperature) of the electronic device 101 based on the measured temperatures of the respective constituent elements. It shall be understood that the antenna module 197, battery 189, communication module 190, and processor 120 are by way of example, not limitation, and other constituent elements can be used.

The temperature measurement module 210 may be separate from the element monitored or integrated to be include with the element monitored.

As will be described below, under certain circumstances, the antenna module 197, the communication module 190, the battery, and/or processor 120 can generate a large amount of heat that can degrade or even destroy the component.

The antenna module 197 may transmit/receive a signal or power to an external electronic device. The antenna module 197 may include a plurality of antennas, and may be controlled by the communication module 190. When the signal strength or power is high or the antenna module 197 is too frequently used, the antenna module 197 may generate a large amount of heat.

The communication module 190 may support at least one or more communications. The communication module 190 may be connected to the antenna module 197, and may select at least one of the plurality of antennas included in the antenna module 197. When the communication module 190 continuously transmits or receives a large amount of data (e.g., moving image streaming service), the communication module may be generate a large amount of heat.

The battery 189 may supply the power to at least one constituent element of the electronic device 101. When the constituent element consumes a large amount of power or when the battery 189 is being charged, the battery may generate a large amount of heat.

The processor 120 may control at least one constituent element of the electronic device 101. When the number of constituent elements of the electronic device 101 controlled by the processor 120 becomes large, or the number of clock cycles are increased, the processor 120 may generate a large amount of heat.

Figure 3:
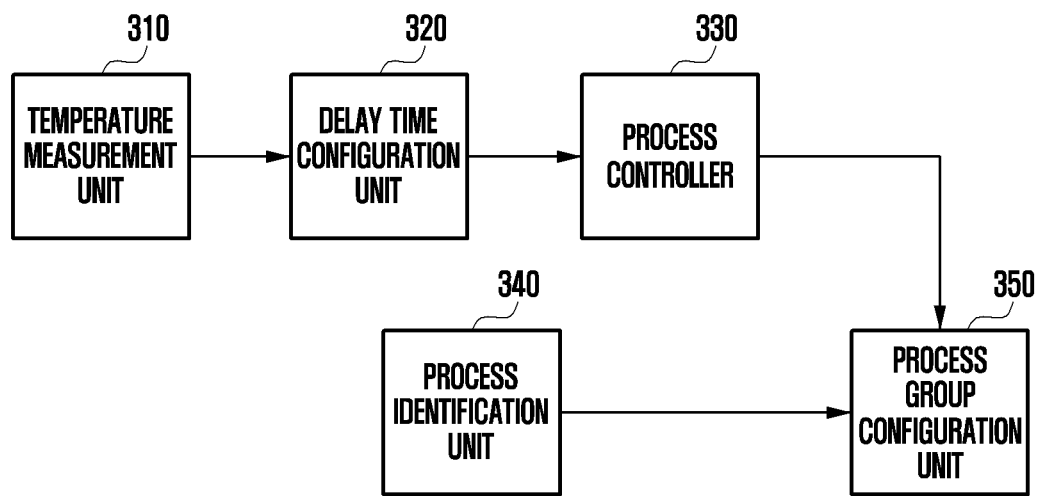
FIG. 3 is a block diagram in accordance with functions of an electronic device according to certain embodiments of the disclosure.

FIG. 3 is a block diagram in accordance with functions of an electronic device according to certain embodiments of the disclosure. The temperature measurement unit 310 measures the temperature and determines the degree of heat generation of the constituent elements. Based on the degree of heat generation, the delay time configuration unit 320 may determine a delay time (if any) of the processor. The process controller 330 and impose or effectuate the delay time for the execution of controllable processes that are not sensed by the user identified by the process identification unit 340.

Referring to FIG. 3, an electronic device (e.g., electronic device 101 of FIG. 1) may include a temperature measurement unit 310, a delay time configuration unit 320, a process controller 330, a process identification unit 340, and a process group configuration unit 350.

The temperature measurement unit 310 may measure the temperature using the temperature measurement module (e.g., temperature measurement module 210 of FIG. 2). The temperature measurement unit 310 may determine the degree of heat generation of the electronic device 101 based on the measured temperature. In case that the temperature measurement module 210 includes a plurality of temperature sensors, the temperature measurement unit 310 may determine the degrees of heat generation of the respective constituent elements or the electronic device 101 based on the temperatures measured from the respective constituent elements (e.g., battery and processor).

The delay time configuration unit 320 may configure (or determine) the delay time of the processor in accordance with the degree of heat generation determined by the temperature measurement unit 310. The delay time configuration unit 320 may configure the delay time in further consideration of the number of processes being driven. If the amount of heat generation is smaller than a predetermined threshold value, the delay time configuration unit 320 may determine a non-heat generation state as the current state, and may configure the delay time to "0" or may not configure the delay time. The delay time configuration unit 320 may transmit the configured delay time to the process controller 330.

The delay time configuration unit 320 may also configure an operation time. The delay time configuration unit 320 may configure the operation time in further consideration of the number of processes being driven. The delay time configuration unit 320 may transmit the configured operation time to the process controller 330.

The process controller 330 may schedule a specific process based on the delay time and/or the operation time transmitted from the delay time configuration unit 320. For example, the process controller 330 may not schedule the specific process for the transmitted delay time. The processor (e.g., processor 120 of FIG. 1) may not drive the unscheduled process. The process controller 330 may re-schedule the specific process after the delay time. The process controller 330 may schedule the specific process for the operation time. If the specific process is scheduled, the processor 120 may drive the specific process. The process controller 330 may repeatedly schedule the specific process using the delay time and/or the operation time. If the processor 120 does not drive the process, the current consumption of the processor 120 may be decreased, and thus the amount of heat generation of the processor 120 may be decreased.

According to certain embodiments of the disclosure, the process identification unit 340 may identify whether there is a controllable process among processes being driven. The controllable process may be a process which uses a system resource above a level determined in a background and which is not sensed by the user. For example, a controllable process may be determined as follows. A process related to a user interface (display, touchscreen, speaker, microphone, camera) may be a process that is sensed by the user, and may be considered an uncontrollable process being driven in a foreground. A process using music, a moving image, or a camera may also be a process being sensed by the user and considered an uncontrollable process being driven in the foreground. A process which uses the processor 120 for more than a predetermined time and above a predetermined level or a process in which data throughput continues for a predetermined time may be a controllable process, but whether to control such a process may be determined in accordance with the degree of heat generation of the electronic device 101. A process receiving broadcast intents, system, virtual private network (VPN), launcher, call, multimedia messaging service (MMS), input to the electronic device 101, or process related to development tools may be considered an uncontrollable process. The process identification unit 340 may transmit the controllable process to the process group configuration unit 350.

By way of example, a controllable process may be a scheduled backup process or a scheduled process transferring data to the cloud.

The process group configuration unit 350 may receive the controllable process transmitted from the process identification unit 340, and may configure a process group. A plurality of process groups may be configured in accordance with the degree of heat generation.

The delay time configuration unit 320, process controller 330, process identification unit 340, and process group configuration unit 350 may be implemented by software (e.g., program 140) including one or more instructions stored in a machine (e.g., electronic device 101) readable storage medium (e.g., built-in memory 136 or external memory 138).

Figure 4:
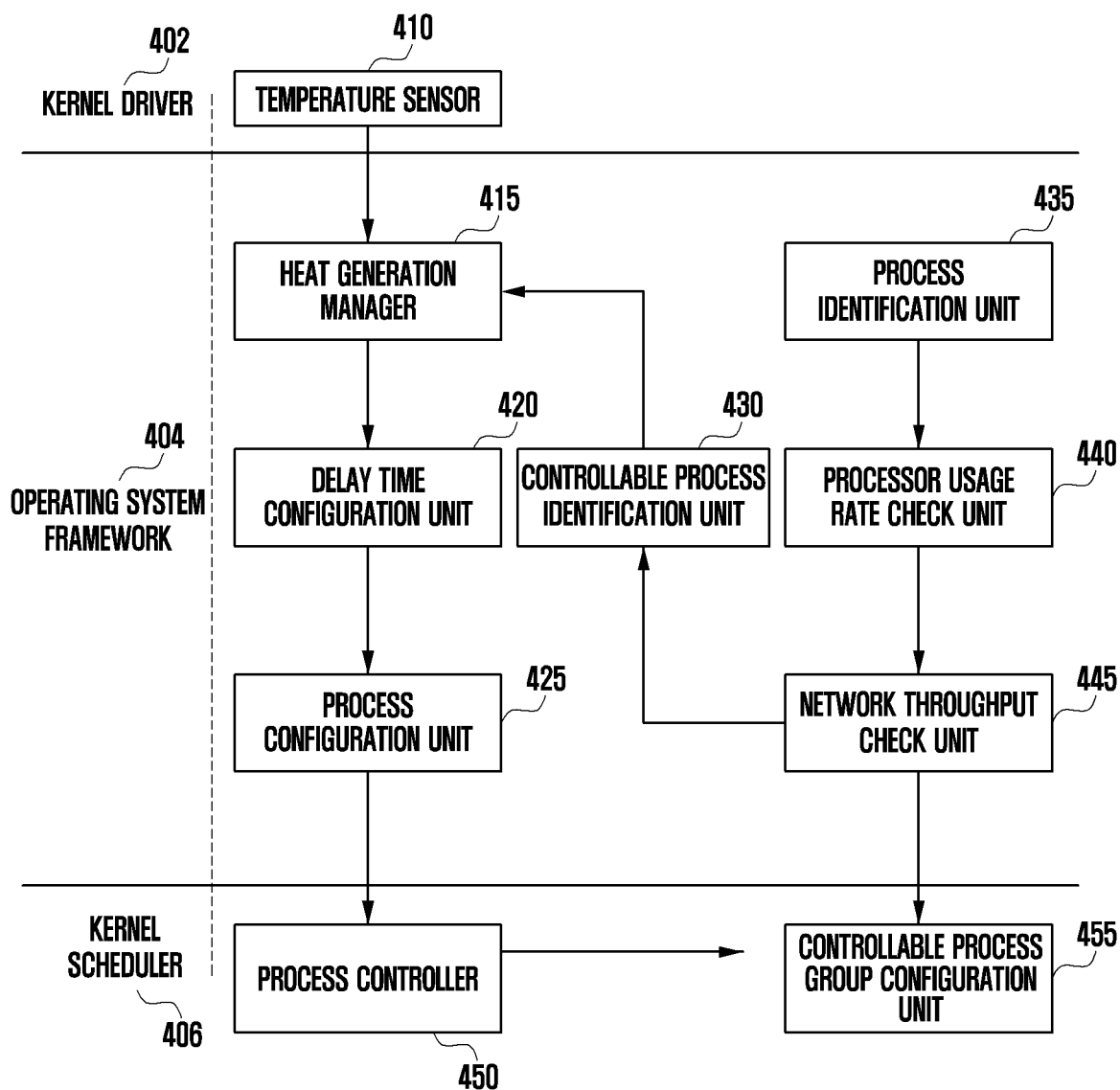
FIG. 4 is a flowchart in accordance with functions of an electronic device according to certain embodiments of the disclosure.

FIG. 4 is a flowchart in accordance with functions of an electronic device according to certain embodiments of the disclosure.

Referring to FIG. 4, an electronic device (e.g., electronic device 101 of FIG. 1) may include a kernel driver 402, an operating system framework 404, and a kernel scheduler 406.

The kernel driver 402 may control hardware (e.g., temperature sensor 410). The kernel driver 402 may measure the temperature by controlling the temperature sensor 410. For example, the kernel driver 402 may read the measured temperature by controlling the temperature sensor 410, or may receive the temperature identified by and transferred from another module (e.g., communication processor). The temperature sensor 410 may be located around a constituent element having a large amount of heat generation in the electronic device 101. If a plurality of temperature sensors 410 are provided, they may be located around a plurality of constituent elements of the electronic device 101, respectively. The kernel driver 402 may transmit the measured temperature to a heat generation manager 415 of the operating system framework 404.

The operating system framework 404 may include the heat generation manager 415, a delay time configuration unit 420, a process configuration unit 425, a controllable process identification unit 430, a process identification unit 435, a processor usage rate check unit 440, and a network throughput check unit 445.

The heat generation manager 415 may determine the degree of heat generation of the electronic device 101 using the temperature transmitted from the temperature sensor 410. If a plurality of temperature sensors 410 are provided, the heat generation manager 415 may receive information about a plurality of temperatures and measurement locations. The heat generation manager 415 may determine the degree of heat generation of the electronic device 101 based on at least parts of the plurality of temperatures.

If the plurality of temperature sensors 410 are provided, the heat generation manager 415 may receive the plurality of temperatures, and may determine the degree of heat generation of the electronic device 101 based on information about the locations where the received temperatures have been measured (e.g., antenna module, communication module, battery, or processor) and the at least parts of the plurality of temperatures.

The degree of heat generation may include a plurality of levels (or steps), and even a case having no heat generation may be included in the plurality of levels (e.g., level 0). In the description, if the amount of heat generation is smaller than a threshold value, it may be considered as no heat generation.

The heat generation manager 415 may transmit the heat generation level corresponding to the degree of heat generation (or measured temperature) among the plurality of heat generation levels to the delay time configuration unit 420. For example, if the measured temperature is 30 C/86 F to 40 C/104 F degrees, the heat generation manager 415 may transmit the heat generation level (e.g., level 2) corresponding to the measured temperature to the delay time configuration unit 420. The range of the respective levels may be configured in consideration of the constituent elements included in the electronic device 101. For example, if the electronic device 101 includes constituent elements being sensitive to the temperature, the number of levels may be increased through subdivision of the levels. In certain embodiments, if the measured temperature is between 20C/68F and 30C/86F, the device is considered at level 1.

The heat generation manager 415 may operate only in case that the heat generation manager 415 is notified of the existence of the controllable process from the controllable process identification unit 430.

The disclosure, the delay time configuration unit 420 may configure (or determine) the delay time and/or the operation time of the processor. The delay time configuration unit 420 may configure the delay time and/or the operation time based on the heat generation level received from the heat generation manager 415. The delay time configuration unit 420 may configure a long delay time in case of determining that the amount of heat generation of the electronic device 101 is large. In case of determining a large amount of heat generation, the delay time configuration unit 420 may configure a short operation time. The delay time configuration unit 420 may transmit the configured delay time and/or operation time to the process configuration unit 425. The delay time and the operation time will be described in detail with reference to FIG. 5 below.

The process configuration unit 425 may configure the delay time and/or the operation time to be applied to the controllable process using the delay time and/or the operation time transmitted from the delay time configuration unit 420.

The process identification unit 435 may identify the process being executed by the processor 120. A plurality of processes may be identified to be under execution. The process identification unit 435 may transmit the identified process to the processor usage rate check unit 440.

The processor usage rate check unit 440 may check the processor usage rate with respect to the respective processes transmitted by the process identification unit 435. The processor usage rate check unit 440 may check (or identify) the process whose usage rate is larger than a first threshold value among the processes transmitted by the process identification unit 435, and may transmit the checked process to the network throughput check unit 445. Even the processes whose usage rates are smaller than the first threshold value may be transmitted to the network throughput check unit 445 for parallel identification of the network throughput. According to certain embodiments of the disclosure, the first threshold value may be determined in consideration of the performance of the process.

The network throughput check unit 445 may check the network throughput with respect to the respective processes transmitted by the processor usage rate check unit 440. The network throughput check unit 445 may check (or identify) the process whose network throughput is larger than a second threshold value among the processes transmitted by the processor usage rate check unit 440, and may transmit the checked process to the controllable process group configuration unit 455 and the controllable process identification unit 430. According to certain embodiments of the disclosure, the second threshold value may be determined in consideration of the kind of the network (e.g., 4th generation (4G), 5G, or wireless fidelity (WIFI)).

The controllable process identification unit 430 may identify whether a controllable process exists among the processes transmitted from the network throughput check unit 445. If it is identified that the controllable process exists, the controllable process identification unit 430 may notify the heat generation manager 415 of the existence of the controllable process.

The kernel scheduler 406 may schedule the process (e.g., program 140 of FIG. 1). The kernel scheduler 406 may include the process controller 450 and the controllable process group configuration unit 455.

The process controller 450 may perform scheduling with respect to the controllable process group configured by the controllable process group configuration unit 455. The process controller 450 may use the delay time and/or the operation time transmitted from the process configuration unit 425.

The controllable process group configuration unit 455 may configure the controllable process group using the process transmitted from the network throughput check unit 445. The controllable process group may be divided into a plurality of controllable process groups based on the first threshold value and/or the second threshold value. A plurality of controllable process groups may be provided in accordance with the first threshold value and/or the second threshold value, and some processes may be included in the plurality of controllable process groups.

The controllable process group may be a group distinguished to differently configure the delay time and the operation time during scheduling. For example, the first group may configure the delay time to 100 ms and the operation time to 200 ms, and the second group may configure both the delay time and the operation time to 100 ms. According to certain embodiments of the disclosure, the controllable process group may be a group which will apply the delay time and the operation time by levels during the scheduling. For example, the first group may be a process group to be applied in case that the first threshold value and the second threshold value are equal to or larger than 60, and the second group may be a process group to be applied in case that the first threshold value and the second threshold value are equal to or larger than 70.

Figure 5:
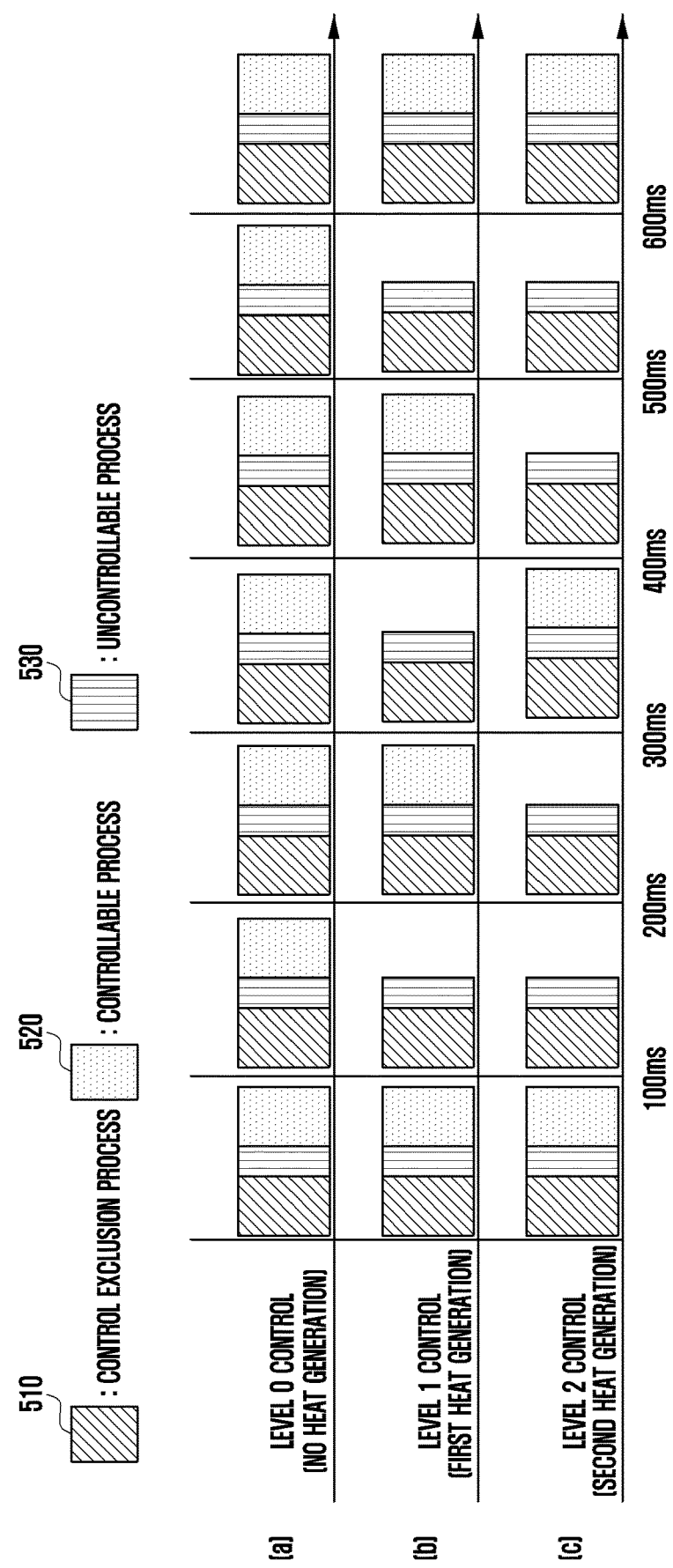
FIG. 5 is a diagram illustrating processes scheduled by a process controller according to certain embodiments of the disclosure.

FIG. 5 is a diagram illustrating processes scheduled by a process controller (e.g., process controller 330 of FIG. 3) according to certain embodiments of the disclosure.

The process controller can set a certain time period, such as 100 ms. Excessive heat can be avoided by not executing controllable processes during a certain proportions of periods. When there is no heat generation, or heat generation is below a first threshold, the electronic device can be considered to be at Level 0 control. When the device is at Level 0, no delay is imposed on control exclusion processes 510, controllable processes 520, and uncontrollable processes 530. When the temperature of the electronic device is within a first range, the execution of controllable processes 520 can be skipped every other time period. When the temperature of the electronic device is within a second range, the execution of controllable processes 520 can be skipped two out of every three time periods.

Referring to FIG. 5, the process may be divided into a control exclusion process 510, a controllable process 520, and an uncontrollable process 530.

The control exclusion process 510 may be a process satisfying a predetermined condition or a process being not included in the controllable process 520 since the amount of heat generation of an electronic device (e.g., electronic device 101 of FIG. 1) is small. For example, if the amount of heat generation of the electronic device 101 is small, the process which uses the processor (e.g., processor 120 of FIG. 1) for more than a predetermined time and above a predetermined level or the process in which data throughput continues for a predetermined time may be included in the control exclusion process 510.

Information about the control exclusion process 510, the uncontrollable process 530, and/or the controllable process 520 may be stored in a memory (e.g., memory 130 of FIG. 1).

Parts of the control exclusion process 510, the uncontrollable process 530, and/or the controllable process 520 may be configured by a user, and a related user interface may be provided to the user.

The controllable process 520 may be a process satisfying the predetermined condition, and may be a process being subjected to the control due to a large amount of heat generation of the electronic device 101. For example, if the amount of heat generation of the electronic device 101 is large, the process which uses the processor 120 for more than a predetermined time and above a predetermined level or the process in which data throughput continues for a predetermined time may be included in the controllable process 520.

The uncontrollable process 530 may be a process being always scheduled regardless of the degree of heat generation of the electronic device 101. According to certain embodiments of the disclosure, the uncontrollable process 530 may be a process related to the critical performance of the electronic device 101. For example, a process receiving broadcast intents, system, virtual private network (VPN), launcher, call, multimedia messaging service (MMS), input to the electronic device 101, or process related to development tools may be a process related to the critical performance of the electronic device 101, and may be included in the uncontrollable process 530. According to certain embodiments of the disclosure, the uncontrollable process 530 may be a process sensitive to the user's sensible performance or a process being driven in the foreground. For example, a process related to a user interface may be a process being driven in the foreground, and a process using music, a moving image, or a camera may be a process sensitive to the user's sensible performance, so that the process related to the user interface and the process using the music, moving image, or camera may be included in the uncontrollable process 530.

The control exclusion process 510 and the uncontrollable process 530 may not be distinguished from each other, and for example, the uncontrollable process 530 may be included in the control exclusion process 510, or the control exclusion process 510 may be included in the uncontrollable process 530.

The control exclusion process 510 and the uncontrollable process 530 may not be processes capable of configuring the delay time and/or the operation time, but the controllable process 520 may be a process capable of configuring the delay time and/or the operation time. FIG. 5 shows processes differently scheduled in accordance with the degree of heat generation of the electronic device 101. That is, (a) to (c) of FIG. 5 distinguishably show the degrees of heat generation as no heat generation, first heat generation, and second heat generation.

In (a) of FIG. 5 shows a case of no heat generation, and level 0 control may be performed. At the level 0 control, all of the control exclusion process 510, the controllable process 520, and the uncontrollable process 530 may be scheduled without the delay time.

In (b) of FIG. 5 shows a first heat generation state, and level 1 control may be performed. At the level 1 control, the control exclusion process 510 and the uncontrollable process 530 may be scheduled without the delay time, and the controllable process 520 may be scheduled through applying of predetermined delay time (e.g., 100 ms) and operation time (e.g., 100 ms). According to certain embodiments of the disclosure, the electronic device 101 may perform scheduling by repeatedly applying the delay time and the operation time.

In (c) of FIG. 5 shows a second heat generation state, and level 2 control may be performed. At the level 2 control, in the same manner as the level 1 control, the control exclusion process 510 and the uncontrollable process 530 may be scheduled without the delay time, and the controllable process 520 may be scheduled through applying of predetermined delay time (e.g., 200 ms) and operation time (e.g., 100 ms). FIG. 5 corresponds to a case that the amount of heat generation of the first heat generation is smaller than the amount of heat generation of the second heat generation, and the delay time of the level 1 control may be shorter than the delay time of the level 2 control.

According to certain embodiments of the disclosure, the electronic device 101 may perform the level 2 control in accordance with the second heat generation, and if the amount of heat generation is decreased, the electronic device 101 may perform the level 1 control.

Figure 6:
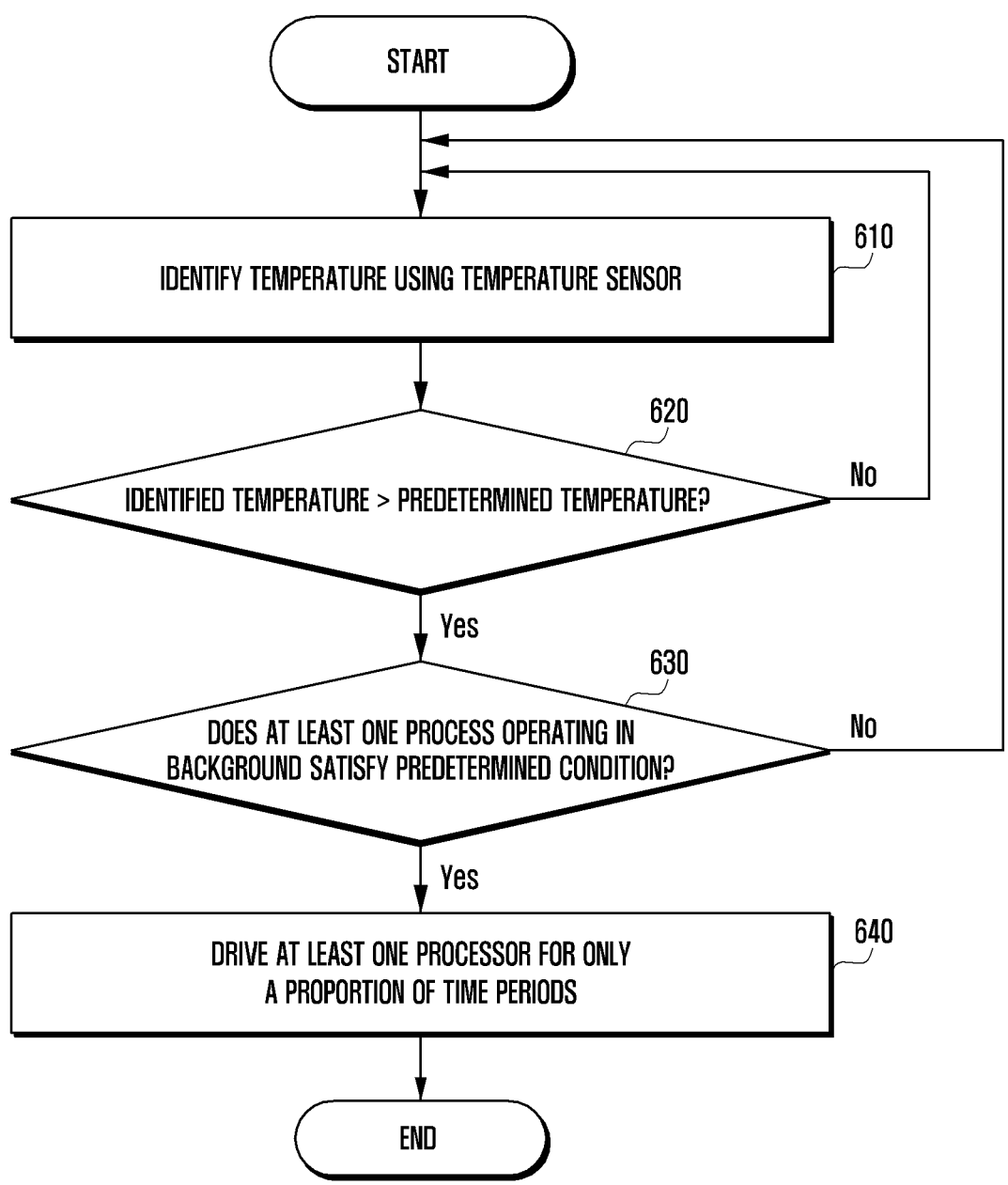
FIG. 6 is a flowchart of an electronic device according to an embodiment of the disclosure.

FIG. 6 is a flowchart of an electronic device according to an embodiment of the disclosure.

At operation 610, the electronic device (e.g., electronic device 101 of FIG. 1 or processor 120 of the electronic device) may identify the temperature measured using the temperature sensor (e.g., temperature sensor 410 of FIG. 4). The temperature measured using the temperature sensor 410 may be the temperature (e.g., maximum temperature) of the electronic device 101. In case that a plurality of temperature sensors 410 are provided, the electronic device 101 may determine the temperature of the electronic device 101 based on a plurality of temperatures.

At operation 620, the electronic device 101 may determine whether the identified temperature is higher than a predetermined temperature. The predetermined temperature may be a temperature corresponding to the degree of heat generation of the electronic device 101. A plurality of predetermined temperatures may be prepared in accordance with the degree of heat generation of the electronic device 101. The electronic device 101 may determine the degree of heat generation through comparison of the identified temperature with the predetermined temperature.

If the identified temperature is higher than the predetermined temperature, the electronic device 101, at operation 630, may determine whether at least one process operating in a background satisfies a predetermined condition. The electronic device 101 may determine whether to satisfy the predetermined condition with respect to all processors operating in the background. The predetermined condition may be a condition that the process uses the system resource above a predetermined level in the background and/or the process is not sensitive to the user's sensible performance. For example, the process related to the user interface may be a process sensitive to the user's sensible performance, and may be a process which is driven in the foreground and which does not satisfy the predetermined condition. The process using the music, moving image, or camera may also be a process sensitive to the user's sensible performance, and may be a process which is driven in the foreground and which does not satisfy the predetermined condition. As another example, the process which uses the processor 120 for more than a predetermined time and above a predetermined level or the process in which data throughput continues for a predetermined time may be the process which satisfies the predetermined condition. The process receiving broadcast intents, system, virtual private network (VPN), launcher, call, multimedia messaging service (MMS), input to the electronic device 101, or process related to development tools may be the process which does not satisfy the predetermined condition.

If the identified temperature is lower than the predetermined temperature, the electronic device 101 may determine that the amount of heat generation is small, schedule all the processes being executed, and re-perform the operation 610 and the subsequent operations.

If at least one process operating in the background satisfies the predetermined condition, the electronic device 101, at operation 640, may drive the at least one process for only a proportion of time periods and not driving the at least one process during a remaining number of time periods, wherein the process is not executed during a first number of time periods having a first time, and executed for a second number of time periods having a second time. In case that a plurality of predetermined conditions are provided, the electronic device 101 may differently schedule the delay time and the operation time by processes satisfying the respective conditions.

According to certain embodiments of the disclosure, if there is not the process satisfying the predetermined condition among the processes operating in the background, the electronic device 101 may schedule all the processes being executed, and re-perform the operation 610 and the subsequent operations.

According to certain embodiments of the disclosure, the electronic device 101 may repeatedly perform the operation 640. The electronic device 101 may perform the operation 640 for a predetermined time, or may perform the operation 640 until the measured temperature is lowered to the predetermined temperature. The electronic device 101 may re-perform the operation 610 and the subsequent operations.

Figure 7A:
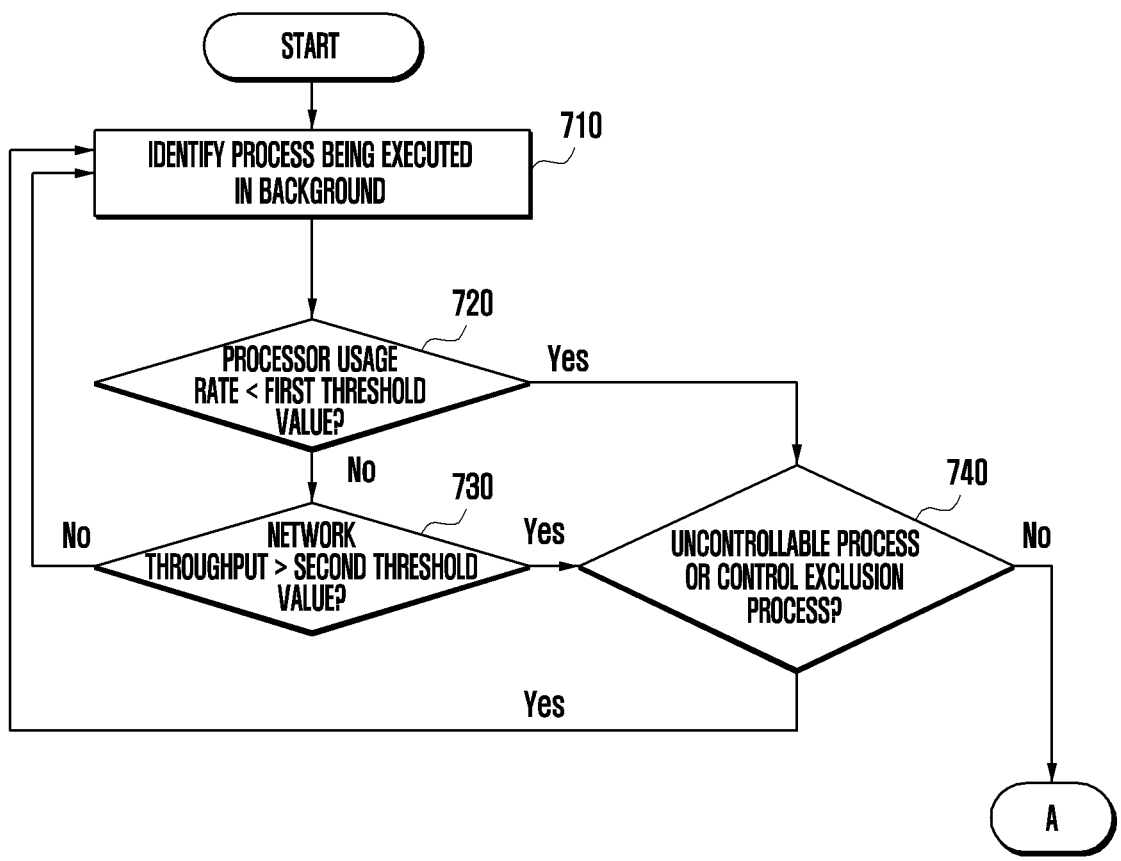
FIG. 7A is a flowchart of an electronic device according to another embodiment of the disclosure.
Figure 7B:
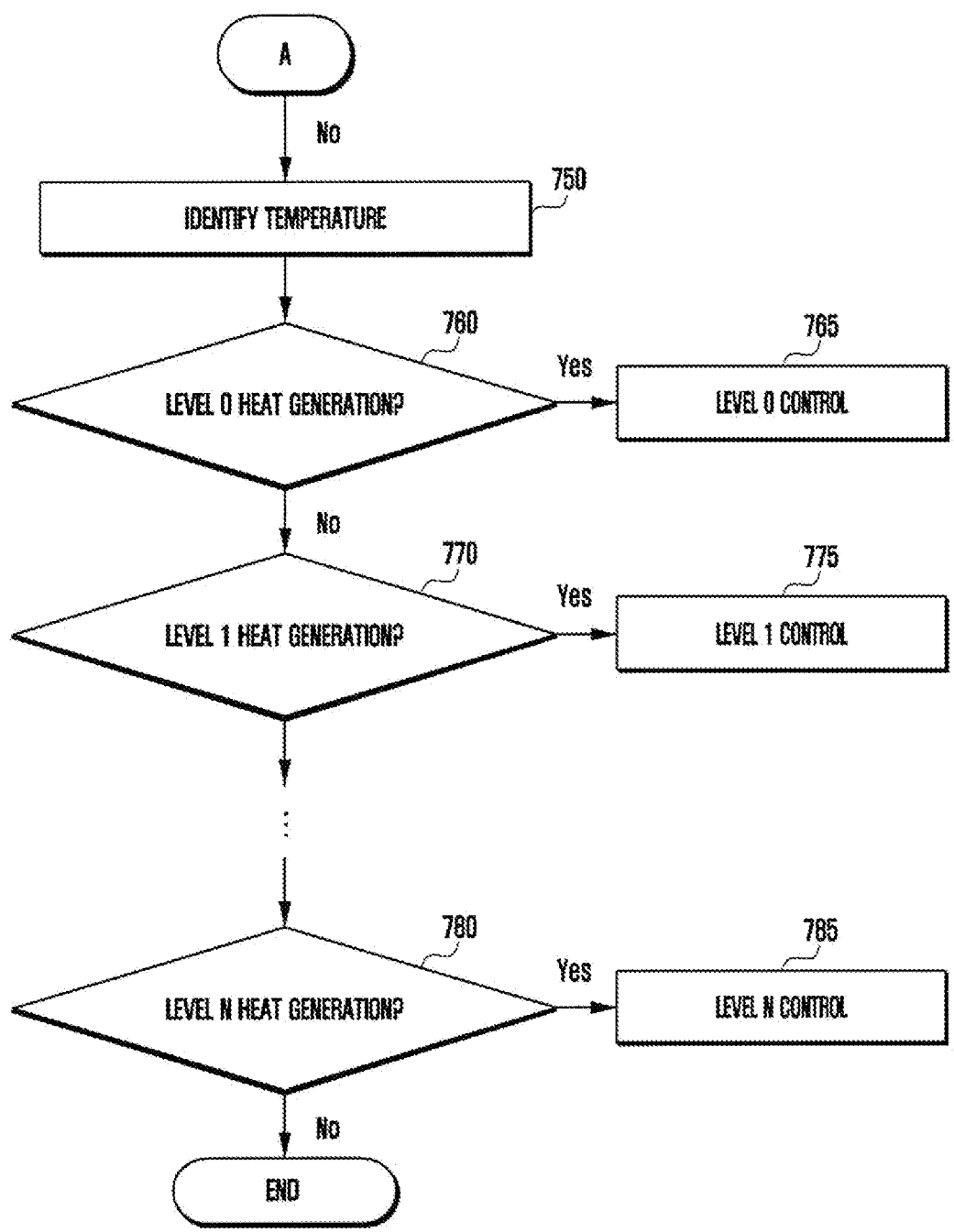
FIG. 7B is a flowchart of an electronic device according to another embodiment of the disclosure.

FIGS. 7A and 7B are a flowchart of an electronic device according to another embodiment of the disclosure.

At operation 710, the electronic device (e.g., electronic device 101 of FIG. 1 or processor 120 of the electronic device) may identify the process being executed in the background.

At operation 720, the electronic device 101 may determine whether there is the process in which the usage rate of the processor 120 is equal to or larger than the first threshold value among the processes identified to be executed in the background. If there is not the process in which the usage rate of the processor 120 is equal to or larger than the first threshold value among the processes identified to be executed in the background, the electronic device 101, at operation 730, may determine whether there is the process whose network throughput is equal to or larger than the second threshold value among the processes identified to be executed in the background. If there is not the process in which the usage rate of the processor 120 is equal to or larger than the first threshold value or whose network throughput is equal to or larger than the second threshold value, the electronic device 101 may schedule all the processes being executed, and re-perform the operation 710 and the subsequent operations.

At operation 730, the electronic device 101 may determine whether there is the process whose network throughput is equal to or larger than the second threshold value. If there is not the process whose network throughput is equal to or larger than the second threshold value, the electronic device 101 may schedule all the processes being executed, and re-perform the operation 710 and the subsequent operations.

In FIG. 7A, the network throughput is compared with the second threshold value after the usage rate of the processor is compared with the first threshold value, but the comparison operations are not limited thereto. According to certain embodiments of the disclosure, the electronic device 101 may compare only the usage rate of the processor with the first threshold value, or may compare the network throughput with the second threshold value. For example, if the usage rate of the processor is equal to or larger than the first threshold value among the processes identified to be executed in the background, the electronic device 101 may perform operation 740. Further, if the network throughput of the process is equal to or larger than the second threshold value among the processes identified to be executed in the background, the electronic device 101 may perform the operation 740. According to certain embodiments, the operation 720 (comparison of the usage rate of the processor with the first threshold value) and the operation 730 (comparison of the network throughput with the second threshold value) may be independently performed, one of the operation 720 and the operation 730 may be omitted, or the performing order of the operation 720 and the operation 730 may be changed.

According to certain embodiments of the disclosure, at operation 740, the electronic device 101 may determine whether there is the uncontrollable process or the control exclusion process among the processes in which the usage rate of the processor 120 is equal to or larger than the first threshold value or whose network throughput is equal to or larger than the second threshold value. The uncontrollable process may be the process sensitive to the user's sensible performance, and may be the process which should always be scheduled regardless of the degree of heat generation of the electronic device 101. For example, the process related to the user interface and the process using the music, moving image, or camera may be included in the uncontrollable process. The control exclusion process (e.g., control exclusion process 510 of FIG. 5) may be the process satisfying the predetermined condition, or the process which is not included in the controllable process 520 since the amount of heat generation of the electronic device (e.g., electronic device 101 of FIG. 1) is small.

According to certain embodiments of the disclosure, if a plurality of processes excluding the uncontrollable process or the control exclusion process are provided among the processes in which the usage rate of the processor 120 is equal to or larger than the first threshold value or whose network throughput is equal to or larger than the second threshold value, they may be managed as a process group.

According to certain embodiments of the disclosure, in case that a plurality of first and second threshold values are configured, a plurality of process groups may be configured and managed.

According to certain embodiments of the disclosure, at operation 750, the electronic device 101 may identify the temperature of the electronic device 101. For example, the electronic device 101 may measure the temperature of an internal configuration (antenna module 197 or communication module 190 of FIG. 2) of the electronic device using the temperature sensor (e.g., temperature sensor 410 of FIG. 4). The electronic device 101 may identify the heat generation level corresponding to the measured temperature.

According to certain embodiments of the disclosure, at operation 760, the electronic device 101 may determine whether the heat generation level is level 0 heat generation based on the temperature identified at operation 750. For example, the level 0 heat generation may be the level of no heat generation.

According to certain embodiments of the disclosure, if the heat generation level is the level 0 heat generation, the electronic device 101, at operation 765, may perform the level 0 control with respect to the process that is not uncontrollable at operation 740. For example, the level 0 control may be the control for the electronic device 101 to schedule all the processes being executed without the delay time. The electronic device 101 may schedule the processes excluding the uncontrollable process or the control exclusion process without the delay time among the processes in which the usage rate of the processor 120 is equal to or larger than the first threshold value or whose network throughput is equal to or larger than the second threshold value.

According to certain embodiments of the disclosure, at operation 770, the electronic device 101 may determine whether the heat generation level is the level 1 heat generation based on the temperature identified at operation 750. For example, the level 1 heat generation may be the heat generation level which has a larger amount of heat generation than the level 0 heat generation, but which has a smaller amount of heat generation than the level n heat generation.

According to certain embodiments of the disclosure, if the heat generation level is the level 1 heat generation, the electronic device 101, at operation 775, may perform the level 1 control. For example, the level 1 control may be the control for the electronic device 101 to make the delay time and the operation time equal to each other during scheduling of the process. The electronic device 101 may schedule the process excluding the uncontrollable process or the control exclusion process through making the delay time and the operation time equal to each other among the processes in which the usage rate of the processor 120 is equal to or larger than the first threshold value or whose network throughput is equal to or larger than the second threshold value.

According to certain embodiments, at operation 775, the electronic device 101 may schedule the process through making the delay time shorter than the operation time during the scheduling of the process.

According to certain embodiments of the disclosure, at operation 780, the electronic device 101 may determine whether the heat generation level is the level n heat generation based on the temperature identified at operation 750. For example, the level n heat generation may be the heat generation level having the largest amount of heat generation.

According to certain embodiments of the disclosure, at operation 785, the electronic device 101 may perform the level n control in case that the heat generation level is the level n heat generation. For example, the level n control may be the control for the electronic device 101 to make the delay time longer than the operation time during the scheduling of the process. The electronic device 101 may schedule the process excluding the uncontrollable process or the control exclusion process through making the delay time longer than the operation time among the processes in which the usage rate of the processor 120 is equal to or larger than the first threshold value or whose network throughput is equal to or larger than the second threshold value.

In certain embodiments, an electronic device comprises a temperature sensor; and a processor, wherein the processor is configured to: detect that a temperature of the electronic device exceeds a predetermined temperature; when the temperature exceeds the predetermined temperature, drive at least one process satisfying a predetermined condition for a proportion of time periods and not driving the at least one process during remaining time periods.

According to certain embodiments, the processor is configured to repeatedly measure the temperature using the temperature sensor, repeatedly determine whether the repeatedly measured temperature exceeds the predetermined temperature, and drive the at least one process for the proportion of time periods and the remaining time periods when the repeatedly measured temperature is lower than the predetermined temperature.

According to certain embodiments, the predetermined condition is that data throughput exceeds a predetermined capacity for a predetermined time.

According to certain embodiments, the predetermined condition is that a usage rate of the processor exceeds a predetermined level for a predetermined time.

According to certain embodiments, the predetermined condition is related to any one of a display, a voice, or a camera.

According to certain embodiments, the processor is configured to drive the process having a high usage rate for the first time.

According to certain embodiments, the processor is configured not to drive the process for the first time.

According to certain embodiments, the predetermined temperature corresponds to a plurality of predetermined temperatures, and the processor is configured to change the first time and the second time in accordance with the plurality of predetermined temperatures.

According to certain embodiments, the processor is configured to form a group including the process satisfying the predetermined condition, and adjust the first driving time and the second driving time using the formed group.

According to certain embodiments, the processor is configured not to adjust the first driving time and the second driving time in case that there is no process included in the group.

According to certain embodiments, a method for operating an electronic device comprises detecting that a temperature of the electronic device exceeds a predetermined temperature; when the temperature exceeds the predetermined temperature, driving at least one process satisfying a predetermined condition for a proportion of time periods and not driving the at least one process during remaining time periods.

According to certain embodiments, the method further comprises: repeatedly measuring the temperature using the temperature sensor; repeatedly determining whether the repeatedly measured temperature exceeds the predetermined temperature; and driving the at least one process for the proportion of time periods and the remaining time periods when the repeatedly measured temperature is lower than the predetermined temperature.

According to certain embodiments, the predetermined condition is that data throughput exceeds a predetermined capacity for a predetermined time.

According to certain embodiments, the predetermined condition is that a usage rate of the processor exceeds a predetermined level for a predetermined time.

According to certain embodiments, the predetermined condition is related to any one of a display, a voice, or a camera.

According to certain embodiments, the method further comprises driving the process having a high usage rate for the first time.

According to certain embodiments, the method further comprises not driving the process for the first time.

According to certain embodiments, the predetermined temperature corresponds to a plurality of predetermined temperatures, and the first time and the second time are changed in accordance with the plurality of predetermined temperatures.

According to certain embodiments, the method further comprises forming a group including the process satisfying the predetermined condition; and adjusting the first driving time and the second driving time using the formed group.

According to certain embodiments, the method further comprises not adjusting the first driving time and the second driving time in case that there is no process included in the group.

OTHER CERTAIN EMBODIMENTS ARE POSSIBLE

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a temperature sensor; and
a processor configured to schedule a plurality of processes within a plurality of time periods, wherein the processor is configured to:
detect that a temperature of the electronic device exceeds a predetermined temperature;
configure a plurality of process groups including a first process group and a second process group, wherein the first process group comprises at least one process that satisfies a predetermined condition, and the second process group comprises at least one process that does not satisfy the predetermined condition, and
when the temperature exceeds the predetermined temperature:
run the at least one process of the first process group within first time periods of the plurality of time periods that are scheduled as operation times for at least one process of the first process group and not run the at least one process of the first process group within second time periods of the plurality of time periods that are scheduled as delay times for at least one process of the second process group, and
run the at least one process of the second process group within each of the plurality of time periods.

2. The electronic device of claim 1, wherein the processor is configured to:
repeatedly measure the temperature using the temperature sensor,
repeatedly determine whether the repeatedly measured temperature exceeds the predetermined temperature, and
un the at least one process of the first process group within the first time periods and the second time periods, when the repeatedly measured temperature is lower than the predetermined temperature.

3. The electronic device of claim 1, wherein the predetermined condition is that data throughput exceeds a predetermined capacity for a predetermined time.

4. The electronic device of claim 1, wherein the predetermined condition is that a usage rate of the processor exceeds a predetermined level for a predetermined time.

5. The electronic device of claim 1, wherein the predetermined condition is related to any one of a display, a voice, or a camera.

6. The electronic device of claim 1, wherein the predetermined temperature corresponds to a plurality of predetermined temperatures, and
the processor is configured to change time length of at least one of the first time periods and the second time periods in accordance with the plurality of predetermined temperatures.

7. The electronic device of claim 1, wherein the processor is configured to:
configure at least a portion of the at least one process of the first process group as a third process group and a remaining of the at least one process of the first process group as a fourth process group, and
wherein delay times of the third process group is longer than delay times of the fourth process group.

8. A method for operating an electronic device, comprising:
scheduling a plurality of processes within a plurality of time periods;
detecting that a temperature of the electronic device exceeds a predetermined temperature; and
configuring a plurality of process groups including a first process group and a second process group, wherein the first process group comprises at least one process that satisfies a predetermined condition, and the second process group comprises at least one process that does not satisfy the predetermined condition; and
when the temperature exceeds the predetermined condition:
running the at least one process of the first process group within first time periods of the plurality of time periods that are scheduled as operation times for at least one process of the first process group and not running the at least one process of the first process group within second time periods of the plurality of time periods that are scheduled as delay times for at least one process of the second process group, and
running the at least one process of the second process group within each of the plurality of time periods.

9. The method of claim 8, further comprising:

repeatedly measuring the temperature using a temperature sensor;

repeatedly determining whether the repeatedly measured temperature exceeds the predetermined temperature; and running the at least one process of the first process group within the first time periods and the second time periods, when the repeatedly measured temperature is lower than the predetermined temperature.

10. The method of claim 8, wherein the predetermined condition is that data throughput exceeds a predetermined capacity for a predetermined time.

11. The method of claim 8, wherein the predetermined condition is that a usage rate of a processor exceeds a predetermined level for a predetermined time.

12. The method of claim 8, wherein the predetermined condition is related to any one of a display, a voice, or a camera.

13. The method of claim 8, wherein the predetermined temperature corresponds to a plurality of predetermined temperatures, and the method further comprises:

changing time length of at least one of the first time periods and the second time periods in accordance with the plurality of predetermined temperatures.

14. The method of claim 8, wherein configuring the plurality of process groups comprises:

configuring at least a portion of the at least one process of the first process group as a third process group and a remaining of the at least one process of the first process group as a fourth process group, and wherein delay times of the third process group is longer than delay times of the fourth process group.

\* \* \* \* \*

UNITED STATES PATENT AND TRADEMARK OFFICE
CERTIFICATE OF CORRECTION

PATENT NO. : 11,481,020 B2
APPLICATION NO. : 17/152968
DATED : October 25, 2022
INVENTOR(S) : Sungyong Bang et al.

It is certified that error appears in the above-identified patent and that said Letters Patent is hereby corrected as shown below:

In the Claims

Column 20, Claim 2, Line 16 should read as follows:
--...run the at least one process...--

Signed and Sealed this
Twenty-second Day of November, 2022

Katherine Kelly Vidal
*Director of the United States Patent and Trademark Office*